G. W. GARDNER.

Stove Grate Bar.

No. 1,685. Reissued May 31, 1864.

Witnesses:
Benj. H. Hall.
Marcus P. Norton

Inventor:
Philo. P. Stewart.

N. PETERS, Photo-Lithographer, Washington, D. C.

UNITED STATES PATENT OFFICE.

PHILO P. STEWART, OF TROY, N. Y., ASSIGNEE OF GEORGE W. GARDNER.

IMPROVEMENT IN STOVE-GRATE BARS.

Specification forming part of Letters Patent No. 8,523, dated November 18, 1851; Reissue No. 1,685, dated May 31, 1864.

*To all whom it may concern:*

Be it known that GEORGE W. GARDNER, formerly of the city of Albany, State of New York, did, on the 18th day of November, 1851, obtain of and from the United States of America certain Letters Patent for and upon Improvements in Stove-Grates, which said patent was duly assigned and transferred to PHILO P. STEWART, of the city of Troy, county of Rensselaer, and State of New York, on the 1st day of July, 1863, and which said assignment was duly recorded in the United States Patent Office; I, therefore, the undersigned assignee, do hereby declare that the following is a full, clear, and exact description of the said improvement in fire grates for stoves, furnaces, &c., and in the agitation of the same, reference being hereby had to the accompanying drawings, and to the letters of reference marked thereon, making a part of this specification.

Figure 1:
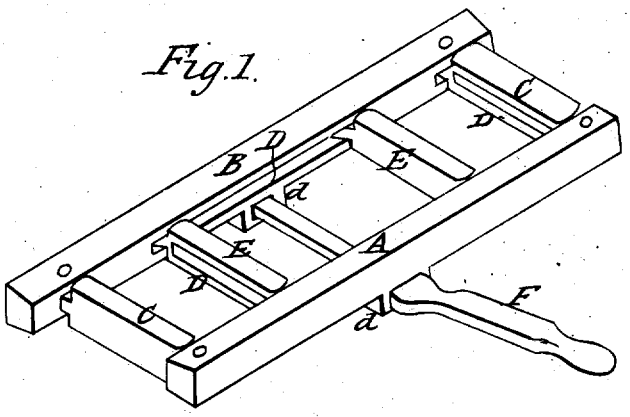
Figure 2:
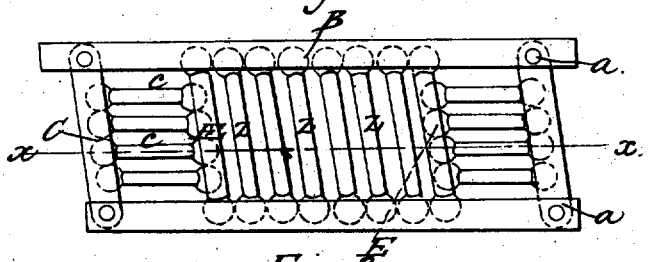
Figure 3:
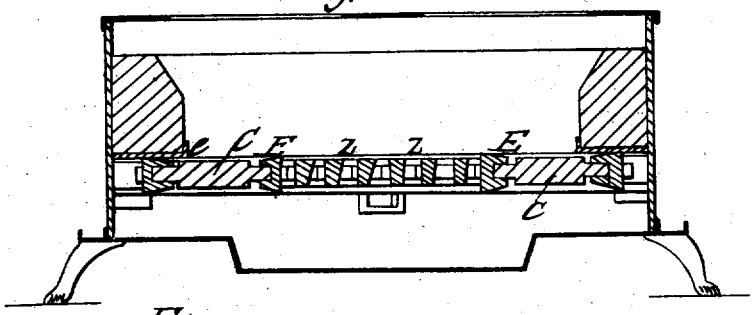
Figure 4:
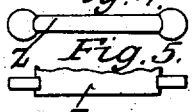
Figure 5:
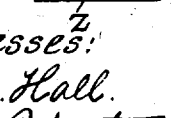

Figure 1 is a perspective view of the frame, the grate-bar being removed therefrom. Fig. 2 is a top view of the entire grate. Fig. 3 is a vertical section in the line *x x* of Fig. 2, placed in the fire-chamber of any stove or furnace. Fig. 4 is a top view, and Fig. 5 is a vertical side view, of one of the grate-bars.

The nature of the invention consists in the detaching clinkers and ashes from burning fuel and discharging the same into an ash-pit by means of a reciprocating or vibrating motion imparted to parallel grate-bars attached to or connected with a frame or yoke, or any equivalent therefor, and operated by a lever moved horizontally by the operator to and fro, thereby moving the grate-bars in a horizontal plane under the fire or bed of coals resting thereon and immediately over the ash-chamber or space below.

It also consists in the employment of parallel grate-bars so constructed, arranged, and combined that they can be vibrated in a horizontal plane and thereby change at each motion their relations to the charge of coal, while at the same time the spaces between them shall be alternately reduced and increased to crush and liberate cinders or clinkers, in the manner hereinafter described and set forth.

To enable others skilled in the art to which this invention relates to make and use the same, I will here proceed to describe the construction and operation of the same, which is as follows, to-wit:

A, Fig. 1, is the frame or yoke upon the front side of the fire-chamber, by means of which the parallel grate-bars are operated. This frame or yoke is operated by means of the lever F, which may be attached and detached as circumstances may require. This frame or yoke may be at the end of the fire-chamber instead of the side thereof, so long as the principle and operation are the same, and it is evident they would be. When thus used, the grate-bars may be attached to the said frame or yoke A in any good, convenient, and substantial manner, whereby the reciprocating or vibrating motion of the grate-bars can be attained for the purposes herein described and set forth.

The grate-bars would all move in a horizontal plane or direction.

There may be as many horizontal grate-bars combined and operating with the said frame or yoke, in the manner and by the means aforesaid, as deemed best. The said grate-bars may also be combined and connected with a frame or yoke at each end thereof, if thought best so to do, which would not change the character or principle of this invention.

The frame B C E has grooves D therein, which support the grate-bars *c* and *l*, so that they may be vibrated laterally by the means herein described for the purpose of crushing the cinders or clinkers and relieving the same, together with the ashes, from the coal or solid burning fuel.

The frame-work B C C is secured firmly in their respective places by means of the rivets *a a*.

In the said grooves is placed the respective ends of the grate-bars *l l*, which ends may be circular and placed close together, as represented in dotted lines. The short bars *c c* are of like construction and placed in like manner in grooves constructed in the said end bars, C C, for that purpose. These bars may without difficulty be extended the whole length of the fire-chamber, if deemed best so to do. The invention would be the same.

The shaker bar or lever F is placed in the loop *d*, or any equivalent therefor, and then vibrated to and fro, thereby giving the whole of the grate-bars aforesaid a horizontal or vibrating motion. This vibrating motion in a horizontal plane of the said grate-bars will crush the cinders or clinkers and detach the same together with the ashes from the coals or solid burning fuel in a most perfect and satisfactory manner, which renders it very convenient for use in cooking-stoves and furnaces which have but small space below the grate for the falling ashes and cinders. The entire operation is most complete and effectual by means of the lever aforesaid.

This grate is particularly applicable and of great utility in cooking-stoves when the oven thereof extends its front part under the fire-box or combustion-chamber, for then the top plate of the oven may come near the said fire-grate, only giving space enough between them to admit of a draft of air to aid or continue combustion in the fire-chamber above, in which case ashes or other material falling from the fire above, down and under the said grate, may be drawn from thereunder into an ash-pan or chamber by any suitable instrument. This kind of fire grate is also applicable to any other kind of stove, and may then be applied with only such mechanical changes as in practice may be required to suit the stove when applied, so long as the leading feature or principle of parallel grate-bars, reciprocating or vibrating in a horizontal plane, is retained or put into use.

The grate-frame rests on ledges inside of the stove, as represented, so that the portions of the frame or yoke which are to vibrate may do so without hinderance, while at the same time the said vibrations alternately enlarge and reduce the spaces between the said grate-bars, so that the cinders or clinkers lodging in such spaces will be alternately crushed, and then liberated and effectually discharged from the coals or solid burning fuel on and above such grate.

And although I have above described but one mode of application of his said invention, yet it will be obvious to the skillful mechanic that this may be greatly changed within the range or scope of his said invention, and therefore I do not wish to be understood as limiting his claim of invention to such mode.

Having thus described the original invention of the said GEORGE W. GARDNER in fire-grates, what I claim as his invention and improvements, and desire to secure by Letters Patent, is—

1. The detaching of cinders, clinkers, or ashes from coals or solid burning fuel by means of parallel grate-bars having an oscillating or vibrating motion in a horizontal plane, imparted thereto by means of a frame, or yoke and lever, or equivalents therefor, in the manner substantially as herein described and set forth.

2. The employment of parallel grate bars so constructed, arranged, and combined with a frame or yoke as to be operated or vibrated in a horizontal plane by means of a lever, substantially as herein described and set forth.

In testimony whereof I have, on this 2d day of July, 1863, hereto set my hand.

P. P. STEWART.

Witness s:

BENJ. H. HALL,

MARCUS P. NORTON.